United States Patent
Xia et al.

(10) Patent No.: US 8,503,337 B2
(45) Date of Patent: Aug. 6, 2013

(54) PHYSICAL UPLINK CONTROL SIGNAL TRANSMITTING METHOD FOR TIME DIVISION DUPLEX SYSTEM

(75) Inventors: Shuqiang Xia, Guangdong (CN); Chunli Liang, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 366 days.

(21) Appl. No.: 12/865,089

(22) PCT Filed: Dec. 29, 2008

(86) PCT No.: PCT/CN2008/002114
§ 371 (c)(1),
(2), (4) Date: Jul. 28, 2010

(87) PCT Pub. No.: WO2009/100608
PCT Pub. Date: Aug. 20, 2009

(65) Prior Publication Data
US 2010/0329159 A1    Dec. 30, 2010

(30) Foreign Application Priority Data
Feb. 5, 2008   (CN) .......................... 2008 1 0008135

(51) Int. Cl.
*H04B 1/52* (2006.01)
(52) U.S. Cl.
USPC .......................................... 370/280; 370/336
(58) Field of Classification Search
USPC ......... 370/280–281, 295, 260–269, 225–228, 370/329–339, 343–349, 342, 311, 346–350, 370/431
See application file for complete search history.

(56) References Cited

U.S. PATENT DOCUMENTS

| 2009/0129259 A1* | 5/2009 | Malladi et al. ................ 370/210 |
| 2009/0141690 A1* | 6/2009 | Fan et al. ....................... 370/335 |
| 2011/0080968 A1* | 4/2011 | Seo et al. ....................... 375/267 |

FOREIGN PATENT DOCUMENTS

| CN | 1747596 | 3/2006 |
| CN | 101106800 | 1/2008 |
| CN | 101227231 | 7/2008 |

OTHER PUBLICATIONS

PCT International Search Report for Int'l Application No. PCT/CN2008/002114, dated Apr. 9, 2009, 2 pages.
English Translation of PCT International Search Report for Int'l Application No. PCT/CN2008/002114, dated Apr. 9, 2009, 2 pages.

* cited by examiner

*Primary Examiner* — Ricky Ngo
*Assistant Examiner* — Iqbal Zaidi
(74) *Attorney, Agent, or Firm* — Haynes and Boone, LLP

(57) ABSTRACT

A method for transmitting a physical uplink control signal in a time division duplex system, wherein the uplink control signal is more than 2 bits. The method comprises the following steps of: a base station distributing a plurality of uplink channel code resources of a physical uplink control channel (PUCCH) for a user equipment, and making an agreement with the user equipment to transmit different contents represented by the uplink control signal using different uplink channel code resources; the user equipment selecting one or more uplink channel code resources from the distributed uplink channel code resources according to the content of the uplink control signal to be transmitted, and transmitting the uplink control signal on the physical uplink control channel.

20 Claims, 3 Drawing Sheets

PHYSICAL UPLINK CONTROL SIGNAL TRANSMITTING METHOD FOR TIME DIVISION DUPLEX SYSTEM

TECHNICAL FIELD

The present invention relates to the field of mobile communication, and in particular, to a method for transmitting a physical uplink control signal in a broadband wireless time division duplex system.

BACKGROUND OF THE INVENTION

With the rapid development of the digital communication system, it is highly required for the reliability of data communication; however, in a bad channel environment, especially in a high data rate or high-speed mobile environment, the multi-path interference, the Doppler Shift and the like will severely affect the system performance. Therefore, an effective error control technique, especially the HARQ (Hybrid Automatic Repeat Request) technique becomes a hot research topic in the communication field.

In the HARQ mode, codes transmitted by a transmitting end are not only able to detect errors, but also have a certain error correction capability. After receiving codes, a decoder at a receiving end firstly detects errors: if the errors are within the error correction capability of the codes, they are automatically corrected; if there are too many errors, which go beyond the error correction capability of the codes, but can still be detected, then the receiving end transmits a decision signal to the transmitting end via a feedback channel to ask the transmitting end to retransmit the information. In an OFDM (Orthogonal Frequency Division Multiplexing) system, an ACK/NACK (Acknowledged/Non-Acknowledged) control signal is used to indicate whether the transmission is right or wrong, thereby judging whether the information needs to be re-transmitted or not.

When the ACK/NACK signal is not transmitted together with uplink data, the ACK/NACK signal will be transmitted on a special Physical Uplink Control Channel (PUCCH). In the present LTE (Long Term Evolution) system, the ACK/NACK signal is carried on a PUCCH reference signal structure, which is as shown in FIG. 1.

FIG. 1 illustrates a PUCCH channel reference signal structure in the present LTE system, which is mainly used to carry ACK/NACK information. In this illustration, a sub-frame of 1 ms is divided into two time slots of 0.5 ms, and when the PUCCH uses a conventional cyclic prefix, each time slot of 0.5 ms includes 7 symbols which are numbered as #0~#6 respectively, and each symbol occupies 12 sub-carriers on the frequency domain; wherein, the symbols numbered as #2~#4 are used to transmit reference signals, as shown in the "time domain DFT covering" area in FIG. 1, and the four symbols numbered as #0, #1, #5, and #6 are used to transmit information symbols, as shown in the "time domain Walsh covering" area.

For an FDD (Frequency Division Duplex) system, since uplink and downlink sub-frames correspond to each other one by one, the ACK/NACK information transmitted in an uplink sub-frame is 1 bit or 2 bits, which corresponds to one or two streams transmitted downlink respectively. The ACK/NACK information of 1 bit/2 bits forms a modulation symbol after BPSK/QPSK modulation. This modulation symbol is firstly subjected to a frequency spreading with a spreading factor of 12 (a CAZAC sequence with a spreading sequence of 12) in a frequency domain, and then is subjected to a time domain spreading through a Walsh code with a length of 4 in a time domain, and then is mapped to an information symbol corresponding to the PUCCH channel reference signal structure as shown in FIG. 1, and finally forms, together with the reference signal, a signal to be transmitted in a time slot. Therefore, for an FDD system, transmitting the ACK/NACK signal using the PUCCH channel reference signal structure as shown in FIG. 1 can satisfy the performance of the ACK/NACK and the requirements of the coverage.

FIG. 2 illustrates the structure of ACK/NACK channel code resources in the present LTE system. The ACK/NACK signals of the UEs in the same cell are multiplexed through a code division. Firstly, on the frequency domain (in the vertical direction in the figure), each UE is multiplexed through different cyclic shifts of the same CAZAC sequence, and then on the time domain (in the horizontal direction in the figure), the multiplexing capacity is further increased through a Walsh sequence spreading. The PUCCH channel occupies 12 sub-carriers on the frequency domain, thus a CAZAC sequence with a length of 12 is used for the frequency domain spreading. There are 4 information symbols on the time domain, thus a Walsh sequence with a length of 4 is used for the time domain spreading of the information symbol; while there are 3 symbols for a reference signal on the time domain, the DFT (Discrete Fourier Transform) spreading with a length of 3 is performed for the reference signal, as shown in FIG. 2. Generally, a CAZAC sequence with a length of 12 has 12 cyclic shifts available in total, but in view of the delayed spreading of a channel, a UE using the same Walsh sequence of the time domain spreading only uses a part of the 12 available cyclic shifts, for example, only (0, 2, 4, 6, 8, 10) or (1, 3, 5, 7, 9) are used.

However, for a TDD (Time Division Duplex) system, due to the asymmetry of the uplink and downlink, for example, when the sub-frames transmitted on the downlink are more than those transmitted on the uplink, it may be necessary to transmit ACK/NACK signals corresponding to a plurality of downlink transmissions in an uplink sub-frame. When the number of the ACK/NACK information bits to be fed back in an uplink sub-frame is more than or equal to 3 bits, a solution is as follows if the PUCCH channel reference signal structure of FIG. 1 is used for transmission: a plurality of ACK/NACK signals are independently encoded and are transmitted on the same time-frequency resource using different code resources. However, the main problem of this solution is that the transmitted signals are not single-carrier signals any more, and thus will have relatively high PAPR (Peak Average Power Ratio), which is not preferable to a UE (User Equipment).

Therefore, it is necessary to provide a new method for transmitting a plurality of ACK/NACK signals in an uplink sub-frame for a TDD system to solve the above problem.

SUMMARY OF THE INVENTION

The technical problem to be solved in the present invention is to find a method for transmitting a physical uplink control signal in a time division duplex system in order to transmit the physical uplink control signal with relatively large number of bits and meanwhile to keep the transmitted signals as single-carrier signals.

In order to solve the above problem, the present invention provides a method for transmitting a physical uplink control signal in a time division duplex system, wherein the uplink control signal is more than 2 bits, comprising the following steps of: a base station NodeB distributing a plurality of uplink channel code resources of a physical uplink control channel (PUCCH) for a user equipment (UE), and making an agreement with the UE about different contents represented by the usage of different uplink channel code resources to transmit the uplink control signal; the UE selecting one or more uplink channel code resources from the distributed uplink channel code resources according to the content of the uplink control signal to be transmitted, and transmitting the uplink control signal on the PUCCH.

Furthermore, the method further comprises the following steps of: (a) the NodeB distributing a plurality of uplink channel code resources for the UE in advance according to the number of bits of the uplink control signal of the UE, and making an agreement with the UE about different contents represented by the usage of different uplink channel code resources to transmit the uplink control signal; (b) when transmitting the uplink control signal, the UE selecting one or more uplink channel code resources from the plurality of uplink channel code resources distributed by the NodeB for the UE according to the content of the uplink control signal to be transmitted, wherein the selected uplink channel code resources indicate the part of the content of the uplink control signal that cannot be carried on the PUCCH, the UE performs the time-frequency spreading using the selected uplink channel code resources and transmits the remaining content of the uplink control signal on the PUCCH.

Furthermore, it is assumed that the number of bits of the uplink control signal to be transmitted in an uplink sub-frame by the UE is M, M>2, the number of the uplink channel code resources distributed by the NodeB for the UE is N, wherein said N is a positive integer that satisfies the following expression: $2^{M-2} \leq N^2$.

Furthermore, said N is a minimum positive integer that satisfies the expression of $2^{M-2} \leq N^2$.

Furthermore, the step of making an agreement with the UE about different contents represented by the usage of different uplink channel code resources to transmit the uplink control signal means: making an agreement with the UE about the contents of the uplink control signal represented by the usage of different uplink channel code resources in different time slots to transmit the uplink control signal; the UE selecting the uplink channel code resources according to the content of the uplink control signal to be transmitted and the agreement with the NodeB, and indirectly indicating the content of part of the uplink control signal that cannot be carried on the PUCCH through the selected uplink channel code resources in different time slots.

Furthermore, in said step (b), when transmitting the uplink control signal, the UE selects one or more channel code resources according to the content of M-2 bits of the uplink control signal and the agreement with the NodeB, uses the selected channel code resources to perform time-frequency spreading and transmits the content of the remaining 2 bits in the uplink control signal on the PUCCH.

Furthermore, the uplink control signal refers to ACK or NACK information.

In order to solve the above problem, the present invention also provides a method for transmitting a physical uplink control signal in a time division duplex system, wherein the uplink control signal is more than 2 bits, comprising the following steps of:

(a) a base station NodeB distributing a plurality of uplink channel code resources for a user equipment (UE) in advance according to the number of bits of the uplink control signal of the UE, and making an agreement with the UE about different contents represented by the usage of different uplink channel code resources to transmit the uplink control signal;

(b) when transmitting the uplink control signal, the UE selecting one or more uplink channel code resources from the plurality of uplink channel code resources distributed by the NodeB for the UE according to the content of the uplink control signal to be transmitted, wherein the selected uplink channel code resources indicate the part of the content of the uplink control signal that cannot be carried on a physical uplink channel control channel (PUCCH), the UE performs the time-frequency spreading using the selected uplink channel code resources and transmits the remaining content of the uplink control signal on the PUCCH;

(c) the NodeB obtaining the uplink control signal according to the channel code resources selected by the UE and the content of the uplink control signal.

Furthermore, in said step (a), it is assumed that the number of bits of the uplink control signal to be transmitted in an uplink sub-frame by the UE is M, M>2, the number of the uplink channel code resources distributed by the NodeB for the UE is N, wherein said N is a positive integer that satisfies the following expression: $2^{M-2} \leq N^2$.

Furthermore, in said step (a), the step of making an agreement with the UE about different contents represented by the usage of different uplink channel code resources to transmit the uplink control signal means: making an agreement with the UE about the contents of the uplink control signal represented by the the usage of different uplink channel code resources in different time slots to transmit the uplink control signal; in said step (b), when transmitting the uplink control signal, the UE selecting one or more uplink channel code resources from the plurality of uplink channel code resources distributed by the NodeB for it according to the content of the uplink control signal to be transmitted and the agreement with the NodeB, and wherein the step of selecting the uplink channel code or codes in different time slots indirectly indicates the part of the content of the uplink control signal that cannot be carried on the PUCCH.

Furthermore, in said step (b), when transmitting the uplink control signal, the UE selects one or more channel code resources according to the content of M-2 bits of the uplink control signal and the agreement with the NodeB, uses the selected channel code resources to perform the time-frequency spreading and transmits the content of the remaining 2 bits of the uplink control signal on the PUCCH; in said step (c), the NodeB obtains the content of M-2 bits of the uplink control signal according to the channel code resources selected by the UE and the agreement with the UE, and obtains the content of the remaining 2 bits of the uplink control signal according to the content carried on the PUCCH.

Furthermore, the uplink control signal refers to ACK or NACK information.

With the method of the present invention, the problem of transmitting a plurality of ACK/NACK signals in an uplink sub-frame in a TDD system can be solved satisfactorily. This method can satisfy the requirements of the performance of the ACK/NACK and the coverage; meanwhile, this method also applies to other uplink control signals with relatively large number of bits while keeping the single-carrier characteristic of the uplink.

PREFERRED EMBODIMENTS OF THE INVENTION

The core idea of the present invention is that a NodeB (base station) distributes a plurality of PUCCH code resources for carrying a plurality of information bits of an uplink control signal, and the NodeB makes an agreement with the UE in advance about different contents of the uplink control signal (i.e., the bit values of the uplink control signal) represented by the usage of different uplink channel code resources in different time slots to transmit the uplink control signal; the UE selects one or more uplink channel code resources from the distributed uplink channel code resources according to the content of the uplink control signal to be transmitted and the agreement with the NodeB, and transmits the uplink control signal on the PUCCH.

The present invention will be described in detail as follows with reference to the drawings and specific embodiments.

The present invention will be described below by taking a UE transmitting an ACK signal or an NACK signal (ACK/NACK hereinafter) to a NodeB as an example. Obviously, in addition to ACK and NACK messages, the present invention can also be used to transmit other physical uplink control signals with the number of bits more than 2. The detailed implementation is the same as that for transmitting ACK/NACK messages, which is obvious to a person skilled in the art.

Figures 1, 2:
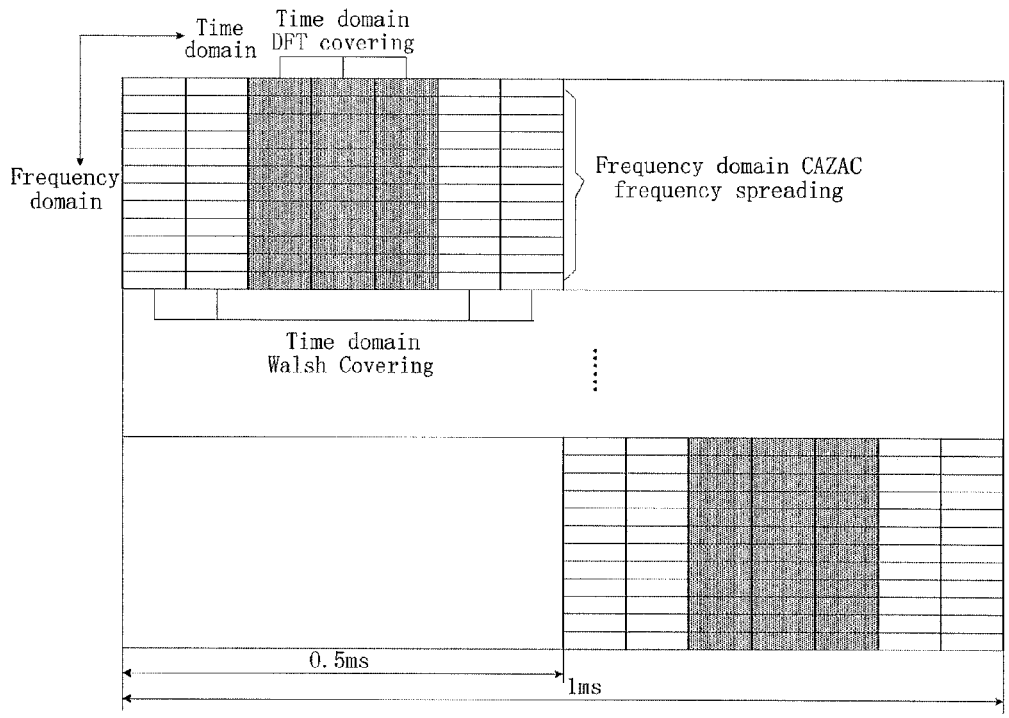
FIG. 1 illustrates a conventional PUCCH reference signal structure.
FIG. 2 illustrates a structure of the conventional ACK/NACK channel code resources.
Figure 3:
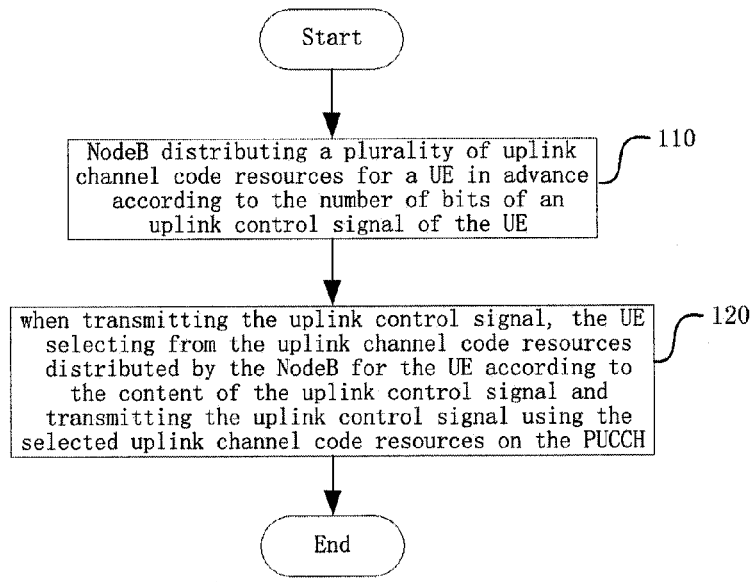
FIG. 3 is a flow chart of transmitting ACK/NACK signals from a UE to a NodeB.

As shown in FIG. 3, the transmitting method comprises the following steps of:

Step 110, a NodeB distributing a plurality of uplink channel code resources for a UE in advance according to the number of bits of an uplink control signal of the UE;

One of the following ways or a combination thereof can be used by a UE to obtain uplink channel code resources distributed by the NodeB for the UE:

the NodeB transmitting the distributed uplink channel code resources to the UE through a downlink physical channel;

the UE determining the channel code resources distributed by the NodeB for the UE according to the time-frequency position of data, which is transmitted by the NodeB and need to be fed back by the UE;

the UE determining the channel code resources distributed by the NodeB for the UE according to the time-frequency position of a resource distribution control message transmitted by the NodeB.

In order to describe more easily, an ACK/NACK channel code resource that is used by the UE on a PUCCH is represented as ($CS_{index}$, $OC_{index}$), wherein $CS_{index}$ refers to the amount of the cyclic shift of a CAZAC sequence on a frequency domain, $CS_{index}=i$ means a CAZAC sequence with a cyclic shift of i, and the value range of $CS_{index}$ is [0, 11], $OC_{index}$ refers to a Walsh orthogonal code index on a time domain, $OC_{index}=j$ means a Walsh sequence with an index of j, and the value range of $OC_{index}$ is [0, 3]. The above two parameters can be used to determine the CAZAC sequence and Walsh sequence that are used respectively in the time-frequency spreading of ACK/NACK.

Assuming that the number of bits of an ACK/NACK message to be transmitted in an uplink sub-frame is M (M>2), then N ACK/NACK channel code resources are distributed for the UE, wherein the value of N is a minimum positive interfere which satisfies the following expression:

$$2^{M-2} \leq N^2 \quad \text{(Expression 1)}$$

The detailed principle may be described as follows: since a PUCCH includes two time slots, part of ACK/NACK information can be carried by using different channel code resources in the two time slots. Assuming that N ACK/NACK channel code resources are distributed for the UE, then there are $N^2$ combinations of code resources in the two time slots of the PUCCH. When the number of bits of the ACK/NACK to be transmitted is M, the first (M-2) bits correspond to $2^{M-2}$ states, and the last 2 bits are carried through QPSK modulation. Therefore, information of M bits can be carried through the N channel code resources as long as the $2^{M-2}$ states corresponding to the first (M-2) bits are smaller than or equal to $N^2$.

Certainly, in other embodiments, the number of the uplink channel code resources distributed by the NodeB for the UE only needs to satisfy Expression 1, and the purpose of it is to implicitly inform the NodeB of the part of bits, which cannot be carried on the PUCCH, by the usage of different uplink channel code resources. It is only a way for saving channel code resources the best when N is the minimum positive integer satisfying the expression.

For example, assuming that the NodeB distributes two code resources: (CSindex, OCindex)=(i, j) and (CSindex, OCindex)=(m, n), then the NodeB and the UE can make an agreement in advance that if the uplink control signal is 3 bits, then only one of the distributed code resources is used. They further make an agreement on the bit value represented by the usage of the codes (CSindex, OCindex)=(i, j) for transmission in the first and the second time slots respectively, and the bit value represented by the usage of (CSindex, OCindex)=(m, n) for transmission in the first and the second time slots respectively. If the uplink control signal is 4 bits, the both distributed code resources are used. It is necessary to further make an agreement on the usage, i.e., the bit values represented by the usage of different code resources in different time slots.

Step 120, when transmitting the uplink control signal, the UE selecting one or more uplink channel code resources from the uplink channel code resources distributed by the NodeB for the UE according to the content of the uplink control signal to be transmitted and the agreement with the NodeB, wherein the selected uplink channel code resources indicate the part of the content of the uplink control signal that cannot be carried on the PUCCH, the UE uses the selected channel code resources to perform the time-frequency spreading and transmits the remaining content of the uplink control signal on the PUCCH.

As described above, when the ACK/NACK to be transmitted by the UE is M bits, the first (M-2) bits correspond to $2^{M-2}$ states, in other words, the channel code resources for transmitting the ACK/NACK is selected according to the value of the first (M-2) bits of the ACK/NACK (i.e., a CAZAC sequence and a Walsh sequence, which are used respectively in the time-frequency spreading). The last 2 bits is formed to be one modulation symbol through QPSK modulation, and the symbol is transmitted on the PUCCH through the previously selected ACK/NACK channel code resources after the time-frequency spreading.

Correspondingly, the NodeB matches the received signal according to the channel code resources distributed for the UE to obtain the information of the first (M-2) bits; then performs an adverse operation of the operation of transmitting the last 2 bits by the transmitting end UE to obtain the information of the last 2 bits.

In other embodiments, the UE can also select to transmit the first 2 bits after modulation whereas it informs the value of the last (M-2) bits to the NodeB in the above noted implicit way, provided that it has made an agreement with the NodeB in advance.

The First Embodiment

Figure 4A:
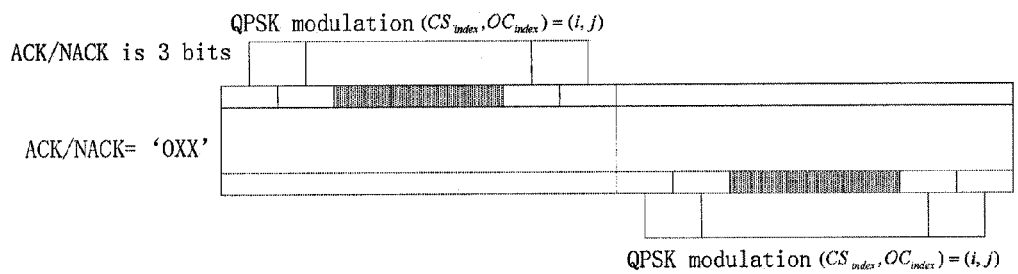
FIGS. 4a-4b illustrate an uplink control signal according to the first embodiment of the present invention.

When M=3, the value of N that satisfies Expression 1 is that N=2, thus two codes are distributed for the UE: (CSindex, OCindex)=(i, j), (CSindex, OCindex)=(m, n):

When ACK/NACK='0XX', as shown in FIG. 4a, a modulation symbol S is obtained by performing QPSK modulation on the information of the last 2 bits 'XX', then the code (CSindex, OCindex)=(i, j) is used to transmit the symbol in the first time slot of the PUCCH reference signal structure, which is described in detail as follows: a CAZAC sequence with a cyclic shift of i is used to perform the frequency domain spreading for the modulation symbol S, and a Walsh sequence with an index number of j is used to perform the time domain spreading for the sequence after the frequency domain spreading, thus obtaining the information symbol to be transmitted in the first time slot of the PUCCH reference signal structure; the code (CSindex, OCindex)=(i, j) is used to transmit the symbol in the second time slot of the PUCCH reference signal structure, which is described in detail as follows: a CAZAC sequence with a cyclic shift of i is used to perform the frequency domain spreading for the modulation symbol S, and a Walsh sequence with an index number of j is used to perform the time domain spreading for the sequence after the frequency domain spreading, thus obtaining the information symbol to be transmitted in the second time slot of the PUCCH reference signal structure.

After having received the uplink control signal, the NodeB determines according to the channel code resources used by the UE for transmitting the uplink control signal that the first bit of the ACK/NACK is 0; and obtains the last 2 bits of "XX" through decoding the information symbol received on the PUCCH, and etc.

Figure 4B:
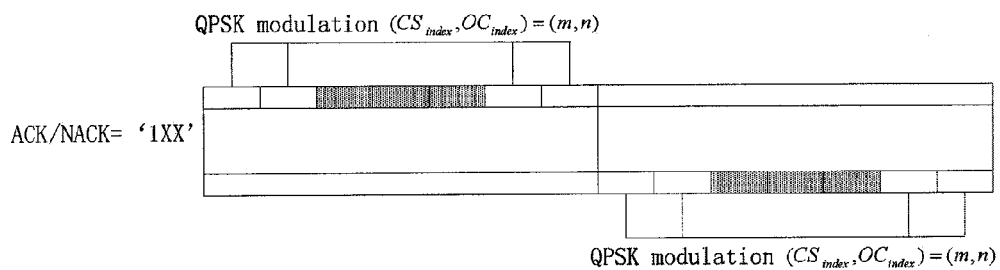

When ACK/NACK=1XX', as shown in FIG. 4b, a modulation symbol S is obtained by performing QPSK modulation on the information of the last 2 bits 'XX', then the code (CSindex, OCindex)=(m, n) is used to transmit the symbol in the first time slot of the PUCCH reference signal structure, which is described in detail as follows: a CAZAC sequence with a cyclic shift of m is used to perform the frequency domain spreading for the modulation symbol S, and a Walsh sequence with an index number of n is used to perform the time domain spreading for the sequence after the frequency domain spreading, thus obtaining the information symbol to be transmitted in the first time slot of the PUCCH reference signal structure; the code (CSindex, OCindex)=(m, n) is used to transmit the symbol in the second time slot of the PUCCH reference signal structure, which is described in detail as follows: a CAZAC sequence with a cyclic shift of m is used to perform the frequency domain spreading for the modulation symbol S, and a Walsh sequence with an index number of n is used to perform the time domain spreading for the sequence after the frequency domain spreading, thus obtaining the information symbol to be transmitted in the second time slot of the PUCCH reference signal structure.

After having received the uplink control signal, the NodeB determines according to the channel code resources used by the UE for transmitting the uplink control signal that the first bit of the ACK/NACK is 1; and obtains the last 2 bits of "XX" through decoding the information symbol received on the PUCCH, and etc.

The Second Embodiment

Figure 5A:
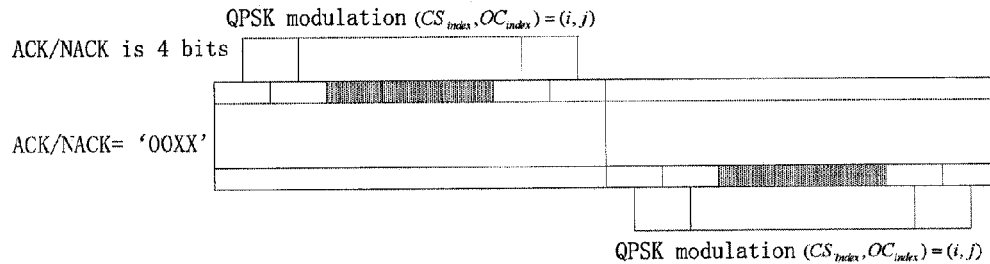
FIGS. 5a-5d illustrate an uplink control signal according to the second embodiment of the present invention.
Figure 5B:
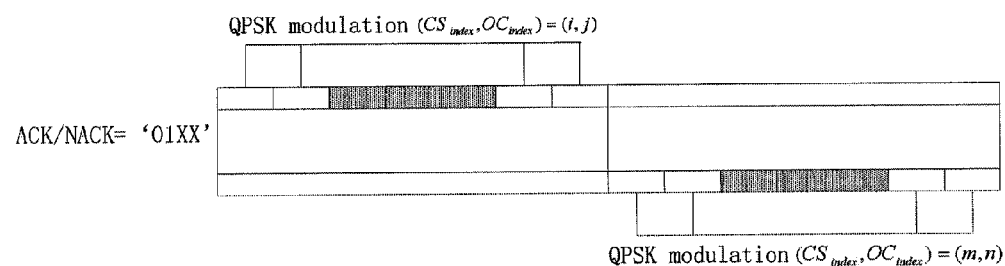
Figure 5C:
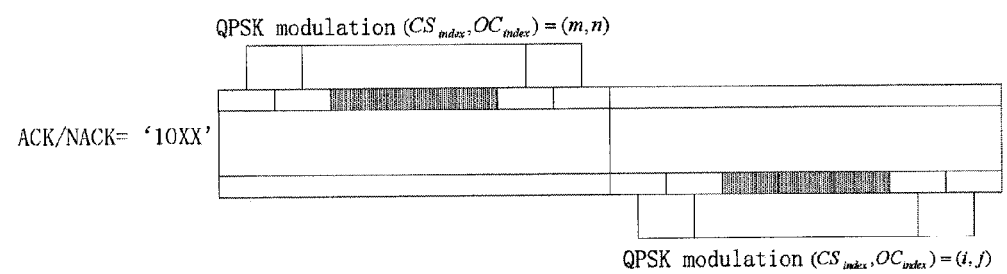
Figure 5D:
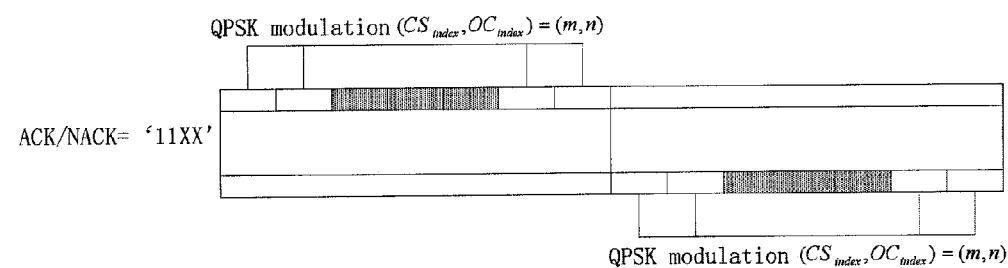

When M=4, the value of N that satisfies the above expression is that N=2, thus two codes are distributed for the UE: (CSindex, OCindex)=(i, j), (CSindex, OCindex)=(m, n):

When ACK/NACK='00XX', as shown in FIG. 5a, the information 'XX' of the last 2 bits is subjected to the QPSK modulation, then the code (CSindex, OCindex)=(i, j) is used to transmit in the first time slot of the PUCCH reference signal structure; the code (CSindex, OCindex)=(i, j) is used to transmit in the second time slot of the PUCCH reference signal structure;

When ACK/NACK='01XX', as shown in FIG. 5b, the information 'XX' of the last 2 bits is subjected to the QPSK modulation, then the code (CSindex, OCindex)=(i, j) is used to transmit the modulation symbol in the first time slot of the PUCCH reference signal structure; the code (CSindex, OCindex)=(m, n) is used to transmit the modulation symbol in the second time slot of the PUCCH reference signal structure;

When ACK/NACK='10XX', as shown in FIG. 5c, the information 'XX' of the last 2 bits is subjected to the QPSK modulation, then the code (CSindex, OCindex)=(m, n) is used to transmit the modulation symbol in the first time slot of the PUCCH reference signal structure; the code (CSindex, OCindex)=(i,j) is used to transmit the modulation symbol in the second time slot of the PUCCH reference signal structure;

When ACK/NACK='11XX', as shown in FIG. 5d, the information 'XX' of the last 2 bits is subjected to the QPSK modulation, then the code (CSindex, OCindex)=(m, n) is used to transmit the modulation symbol in the first time slot of the PUCCH reference signal structure; the code (CSindex, OCindex)=(m,n) is used to transmit the modulation symbol in the second time slot of the PUCCH reference signal structure;

After having received the uplink control signal, the NodeB determines the first two bits of the ACK/NACK according to the channel code resources used by the UE for transmitting the uplink control signal; and obtains the last 2 bits of the ACK/NACK through decoding the information symbol received on the PUCCH, and etc.

The above embodiments are only examples for the purpose of illustration, and other situations can be included within the same principle.

Additionally, in other embodiments, the information of the first 2 bits can also be subjected to the QPSK modulation, while the content of the subsequent bits is implicitly informed to the NodeB through the used code resources.

With the method of the present invention, the problem of transmitting a plurality of ACK/NACK signals in an uplink sub-frame in a TDD system can be solved satisfactorily. This method can satisfy the requirements of the performance of the ACK/NACK and the coverage, while keeping the single-carrier characteristic of the uplink.

A person skilled in the art should understand that the embodiments as described above are only the preferred embodiments of the present invention, and are not intended to limit the scope of the present invention; and that all equivalent variations and modifications made based on the present invention shall be covered by the patent scope of the present invention.

INDUSTRIAL APPLICABILITY

With the method of the present invention, the problem of transmitting a plurality of ACK/NACK signals in an uplink sub-frame in a TDD system can be solved satisfactorily. This method can satisfy the requirements of the performance of the ACK/NACK and the coverage; meanwhile, this method also applies to other uplink control signals with relatively large number of bits while keeping the single-carrier characteristic of the uplink.

What we claim is:

1. A method for transmitting a physical uplink control signal in a time division duplex system, wherein the uplink control signal is more than 2 bits, comprising the following steps of:
   a base station NodeB distributing a plurality of uplink channel code resources of a physical uplink control channel (PUCCH) for a user equipment (UE), and making an agreement with the UE about different contents represented by the usage of different uplink channel code resources to transmit the uplink control signal; the UE selecting one or more uplink channel code resources from the distributed uplink channel code resources according to the content of the uplink control signal to be transmitted and the agreement, and transmitting the uplink control signal on the PUCCH;
   when transmitting the uplink control signal, the UE selecting one or more uplink channel code resources from the plurality of uplink channel code resources distributed by the NodeB for the UE according to the content of the uplink control signal to be transmitted, wherein the selected uplink channel code resources indicate the part of the content of the uplink control signal that cannot be carried on the PUCCH, and the UE performing the time-frequency spreading using the selected uplink channel code resources and transmitting the remaining content of the uplink control signal on the PUCCH.

2. The method according to claim 1, further comprising the following steps of:
   the NodeB distributing a plurality of uplink channel code resources for the UE in advance according to the number of bits of the uplink control signal of the UE, and making an agreement with the UE about different contents represented by the usage of different uplink channel code resources to transmit the uplink control signal.

3. The method according to claim 2, wherein it is assumed that the number of bits of the uplink control signal to be transmitted in an uplink sub-frame by the UE is M, M>2, the number of the uplink channel code resources distributed by the NodeB for the UE is N;
   said N is a positive integer that satisfies the following expression: $2^{m-2} \leq N^2$.

4. The method according to claim 3, wherein said N is a minimum positive integer that satisfies the expression of $2^{M-2} \leq N^2$.

5. The method according to claim 1, wherein,
   the step of making an agreement with the UE about different contents represented by the usage of different uplink channel code resources to transmit the uplink control signal comprises: making an agreement with the UE about the contents of the uplink control signal represented by the usage of different uplink channel code resources in different time slots to transmit the uplink control signal; the UE selecting the uplink channel code resources according to the content of the uplink control signal to be transmitted and the agreement with the NodeB, and indirectly indicating the part of the content of the uplink control signal that cannot be carried on the PUCCH through the selected uplink channel code resources in different time slots.

6. The method according to claim 3, wherein in said step (b),
   when transmitting the uplink control signal, the UE selects one or more channel code resources according to the content of M-2 bits of the uplink control signal and the agreement with the NodeB, performs the time-frequency spreading using the selected channel code resources and transmits the content of the remaining 2 bits of the uplink control signal on the PUCCH.

7. The method according to claim 1, wherein, the uplink control signal refers to ACK or NACK information.

8. A method for transmitting a physical uplink control signal in a time division duplex system, wherein the uplink control signal is more than 2 bits, comprising the following steps of:
   (a) a base station NodeB distributing a plurality of uplink channel code resources for a user equipment (UE) in advance according to the number of bits of the uplink control signal of the UE, and making an agreement with the UE about different contents represented by the usage of different uplink channel code resources to transmit the uplink control signal;
   (b) when transmitting the uplink control signal, the UE selecting one or more uplink channel code resources from the plurality of uplink channel code resources distributed by the NodeB for the UE according to the content of the uplink control signal to be transmitted, wherein the selected uplink channel code resources indicate the part of the content of the uplink control signal that cannot be carried on a physical uplink channel control channel (PUCCH), and the UE performing the time-frequency spreading using the selected uplink channel code resources and transmitting the remaining content of the uplink control signal on the PUCCH; and
   (c) the NodeB obtaining the uplink control signal according to the channel code resources selected by the UE and the content carried on the PUCCH.

9. The method according to claim 8, wherein, in said step (a),
   it is assumed that the number of bits of the uplink control signal to be transmitted in an uplink sub-frame by the UE is M, M>2, the number of the uplink channel code resources distributed by the NodeB for the UE is N;
   said N is a positive integer that satisfies the following expression: $2^{M-2} \leq N^2$;
   in said step (a), the step of making an agreement with the UE about different contents represented by the usage of different uplink channel code resources to transmit the uplink control signal comprises: making an agreement with the UE about the contents of the uplink control signal represented by the usage of different uplink channel code resources in different time slots to transmit the uplink control signal;
   in said step (b), when transmitting the uplink control signal, the UE selecting one or more uplink channel code resources from the plurality of uplink channel code resources distributed by the NodeB for the UE according to the content of the uplink control signal to be transmitted and the agreement with the NodeB, and indirectly indicating the part of the content of the uplink control signal that cannot be carried on the PUCCH through the selected uplink channel code resources in different time slots;
   in said step (b), when transmitting the uplink control signal, the UE selects one or more channel code resources according to the content of M-2 bits in the uplink control signal and the agreement with the NodeB, uses the selected channel code resources to perform the time-frequency spreading and transmits the content of the remaining 2 bits of the uplink control signal on the PUCCH;
   in said step (c), the NodeB obtains the content of M-2 bits of the uplink control signal according to the channel code resources selected by the UE and the agreement with the UE, and obtains the content of the remaining 2 bits of the uplink control signal according to the content carried on the PUCCH;
   wherein, the uplink control signal refers to ACK or NACK information.

10. The method according to claim 9, wherein, said N is a minimum positive integer that satisfies the expression of $2^{M-2} \leq N^2$, and in said step (a), the step of making an agreement with the UE about different contents represented by the usage of different uplink channel code resources to transmit the uplink control signal comprises: making an agreement with the UE about the contents of the uplink control signal represented by the usage of different uplink channel code resources in different time slots to transmit the uplink control signal;

in said step (b), when transmitting the uplink control signal, the UE selecting one or more uplink channel code resources from the plurality of uplink channel code resources distributed by the NodeB for the UE according to the content of the uplink control signal to be transmitted and the agreement with the NodeB, and indirectly indicating the part of the content of the uplink control signal that cannot be carried on the PUCCH through the selected uplink channel code resources in different time slots;

in said step (b), when transmitting the uplink control signal, the UE selects one or more channel code resources according to the content of M-2 bits in the uplink control signal and the agreement with the NodeB, uses the selected channel code resources to perform the time-frequency spreading and transmits the content of the remaining 2 bits of the uplink control signal on the PUCCH;

in said step (c), the NodeB obtains the content of M-2 bits of the uplink control signal according to the channel code resources selected by the UE and the agreement with the UE, and obtains the content of the remaining 2 bits of the uplink control signal according to the content carried on the PUCCH;

wherein, the uplink control signal refers to ACK or NACK information.

11. The method according to claim 8, wherein, in said step (a), the step of making an agreement with the UE about different contents represented by the usage of different uplink channel code resources to transmit the uplink control signal comprises: making an agreement with the UE about the contents of the uplink control signal represented by the usage of different uplink channel code resources in different time slots to transmit the uplink control signal;

in said step (b), when transmitting the uplink control signal, the UE selecting one or more uplink channel code resources from the plurality of uplink channel code resources distributed by the NodeB for the UE according to the content of the uplink control signal to be transmitted and the agreement with the NodeB, and indirectly indicating the part of the content of the uplink control signal that cannot be carried on the PUCCH through the selected uplink channel code resources in different time slots.

12. The method according to claim 8, wherein, in said step (b), when transmitting the uplink control signal, the UE selects one or more channel code resources according to the content of M-2 bits in the uplink control signal and the agreement with the NodeB, uses the selected channel code resources to perform the time-frequency spreading and transmits the content of the remaining 2 bits of the uplink control signal on the PUCCH;

in said step (c), the NodeB obtains the content of M-2 bits of the uplink control signal according to the channel code resources selected by the UE and the agreement with the UE, and obtains the content of the remaining 2 bits of the uplink control signal according to the content carried on the PUCCH.

13. The method according to claim 8, wherein, the uplink control signal refers to ACK or NACK information.

14. The method according to claim 2, wherein, the step of making an agreement with the UE about different contents represented by the usage of different uplink channel code resources to transmit the uplink control signal comprises: making an agreement with the UE about the contents of the uplink control signal represented by the usage of different uplink channel code resources in different time slots to transmit the uplink control signal; the UE selecting the uplink channel code resources according to the content of the uplink control signal to be transmitted and the agreement with the NodeB, and indirectly indicating the part of the content of the uplink control signal that cannot be carried on the PUCCH through the selected uplink channel code resources in different time slots.

15. The method according to claim 3, wherein, the step of making an agreement with the UE about different contents represented by the usage of different uplink channel code resources to transmit the uplink control signal comprises: making an agreement with the UE about the contents of the uplink control signal represented by the usage of different uplink channel code resources in different time slots to transmit the uplink control signal; the UE selecting the uplink channel code resources according to the content of the uplink control signal to be transmitted and the agreement with the NodeB, and indirectly indicating the part of the content of the uplink control signal that cannot be carried on the PUCCH through the selected uplink channel code resources in different time slots.

16. The method according to claim 4, wherein, the step of making an agreement with the UE about different contents represented by the usage of different uplink channel code resources to transmit the uplink control signal comprises: making an agreement with the UE about the contents of the uplink control signal represented by the usage of different uplink channel code resources in different time slots to transmit the uplink control signal; the UE selecting the uplink channel code resources according to the content of the uplink control signal to be transmitted and the agreement with the NodeB, and indirectly indicating the part of the content of the uplink control signal that cannot be carried on the PUCCH through the selected uplink channel code resources in different time slots.

17. The method according to claim 4, wherein in said step (b), when transmitting the uplink control signal, the UE selects one or more channel code resources according to the content of M-2 bits of the uplink control signal and the agreement with the NodeB, performs the time-frequency spreading using the selected channel code resources and transmits the content of the remaining 2 bits of the uplink control signal on the PUCCH.

18. The method according to claim 2, wherein, the uplink control signal refers to ACK or NACK information.

19. The method according to claim 3, wherein, the uplink control signal refers to ACK or NACK information.

20. The method according to claim 4, wherein, the uplink control signal refers to ACK or NACK information.

* * * * *